United States Patent [19]
Davis et al.

[11] Patent Number: 5,195,850
[45] Date of Patent: Mar. 23, 1993

[54] APPARATUS AND METHOD FOR TRANSPORTING BUOYANT PARTICULATE MATTER SUCH AS ICE TO A SUBMERGED LOCATION IN A FLUID

[75] Inventors: Thomas L. Davis; Robert N. Elliott, III; Charles R. Zickefoose, all of Raleigh, N.C.

[73] Assignees: Carolina Power & Light Company, Raleigh; North Carolina Alternative Energy Corporation, Research Triangle Park, both of N.C.

[21] Appl. No.: 756,498

[22] Filed: Sep. 9, 1991

[51] Int. Cl.⁵ .............................................. B65G 53/30
[52] U.S. Cl. ..................................... 406/92; 406/106; 406/109; 406/144; 406/197
[58] Field of Search .................... 406/92, 144, 109, 48, 406/154, 157, 106, 122, 197, 198

[56] References Cited

U.S. PATENT DOCUMENTS

| | | |
|---|---|---|
| 2,085,842 | 7/1937 | Wentworth ........................ 406/92 X |
| 2,794,686 | 6/1957 | Anselman et al. ................ 406/92 X |
| 3,301,606 | 1/1967 | Bruno . |
| 3,857,651 | 12/1974 | Bruno . |
| 3,990,253 | 11/1976 | Lea, Jr. et al. . |
| 4,028,009 | 6/1977 | Gudzenko et al. . |
| 4,239,424 | 12/1980 | Pavolka ............................. 406/157 |
| 4,320,995 | 3/1982 | Tennes et al. ...................... 406/39 |
| 4,372,712 | 2/1983 | Powell et al. . |
| 4,373,836 | 2/1983 | Cox et al. . |
| 4,748,817 | 6/1988 | Oura et al. . |
| 4,793,146 | 12/1988 | Ryokai . |
| 4,813,597 | 3/1989 | Rumney et al. . |

Primary Examiner—Margaret A. Focarino
Assistant Examiner—Gary C. Hoge
Attorney, Agent, or Firm—Richard S. Faust

[57] ABSTRACT

Buoyant particles entrained in a transport water are delivered to the bottom of a flooded vessel, overcoming the buoyant force of the particles and other fluid dynamics problems associated with entrained fluid flow. In a preferred embodiment, ice particles are delivered through a conduit to the bottom of a flooded thermal storage tank by entraining the ice particles in a swirling transport water.

18 Claims, 5 Drawing Sheets

APPARATUS AND METHOD FOR TRANSPORTING BUOYANT PARTICULATE MATTER SUCH AS ICE TO A SUBMERGED LOCATION IN A FLUID

FIELD OF THE INVENTION

The invention relates to the transporting of buoyant particles to a submerged location. In certain applications, the invention permits the transport of ice particles to a location below the water level in a flooded vessel, overcoming buoyant forces created by the ice-in-water environment. In one preferred application, the invention is utilized to transport ice particles through a conduit to a discharge point at the bottom of a flooded thermal storage tank and to uniformly disperse the ice particles into the tank.

BACKGROUND OF THE INVENTION

The transport of buoyant particles through a conduit to a submerged location in a fluid presents a complex and challenging fluid dynamics problem. As an initial consideration, when the buoyant particles are mixed with a transport fluid in the conduit, the buoyant force acting on the particles must be overcome by a greater downward fluid dynamic drag force on the particles. Also, the static pressure head created by the fluid in the vessel must be overcome. The value of the static pressure is directly related to the density of the fluid in the vessel and the depth to which the buoyant particles are being transported. Beyond these considerations, however, one must take into account the behavior of the buoyant particles/fluid mixture in the pipe in terms of (i) loss of entrainment of particles in low velocity portions of the flow field which may be caused by the effect of the pipe walls on the flow and (ii) the "N body problem," i.e., the effect of the relative motion of many bodies being propelled by fluid flow in close proximity to one another. All of the above considerations present a fluid dynamics problem that is not one subject to facile analysis. As one basic proposition, in order to maintain an acceptable velocity of the buoyant particles in the delivery conduit, the aggregate axial drag on the particles must exceed the aggregate buoyant force on the particles as measured over the entire path of travel through the conduit. Also, the dynamic pressure head of the buoyant particles/fluid mixture as it is introduced into the delivery pipe must be sufficient to overcome the static pressure head plus frictional losses at the boundary. At any particular mass flow rate, pipe diameter and delivery depth, the possibility of loss of entrainment and the N body problem must also be taken into account.

The above situation may be addressed by the use of "brute force"; i.e., pumping the buoyant particles/fluid mixture into the delivery conduit with a high velocity and high kinetic energy sufficient to push the mixture through the conduit. However, this approach suffers the disadvantage of being wasteful from an energy standpoint and requires the use of expensive and complex pumps for supplying the necessary energy to a mixture of buoyant particles and fluid.

Another approach of a different nature simply uses a mechanical conveyance, such as an auger screw pump. But, for many applications, it is undesirable to have mechanical means that may be subject to repair or maintenance at a submerged location.

Other solutions include the use of an aspirating jet pump, as discussed, for example, in commonly owned, co-pending application Ser. No. 07/543,360 entitled "Thermal Storage Tank System and Method", now U.S. Pat. No. 5,063,748. While the aspirating pump may serve to entrain the buoyant particles in the fluid by providing sufficient drag on the buoyant particles so that the drag on the particles exceeds their buoyancy, it may not maintain the desired entrainment once "fully developed pipe flow" velocity profiles are established. Beyond this point, buoyant particles will migrate to the low velocity field near the conduit wall and may even reverse direction of movement if the fluid dynamic drag becomes less than the buoyant force. Furthermore, a low velocity field may result in a bridging phenomenon caused by ice particle agglomeration which may be especially acute when the transport water is at or near 32° F.

In view of the above, it will be appreciated that there is a need for an energy efficient, reliable and simple system for addressing the above problems with respect to the delivery of buoyant particles to a submerged location in a flooded vessel and, as discussed immediately below, particularly with respect to the delivery of ice to a submerged location in a thermal storage tank.

Recently, the long term storage of thermal energy has emerged as a means to spread out electricity usage over long periods of time to reduce electric utilities' short term seasonal loads. According to one long term thermal energy storage system, an ice machine is operated on a continuous basis year-round with the ice being stored in an ice/water mixture in a thermal storage tank. The thermal energy in the tank is available for use on demand during periods that coincide with the electric utility's seasonal peak load operating times during the summer, for example, to provide space air-conditioning, harvested crop cooling, greenhouse space cooling, poultry house cooling, etc. Thus, the system enables the electric utility to substitute a relatively small, long term level load for a much higher direct acting load that would coincide with, or largely overlap, the utility's seasonal peak usage.

The above system requires a thermal storage tank that will efficiently store the generated ice over long term periods measured in months. It has been found desirable in the operation of such a thermal storage tank to maintain the tank in a flooded state such that it is continuously filled with an ice/water mixture. After a long period of charging the tank with ice, the ice fraction in the tank will increase to a high level, for example, 85% or higher. In contrast, after a substantial amount of the ice has been melted to meet short term cooling demands, the ice friction may be as little as, for example, 5–15%.

It has been found desirable in the operation of such thermal energy storage systems to deliver the ice through a conduit to the flooded thermal storage tank at a point near the bottom of the tank so that the ice mass "grows" in the tank in the shape of an inverted cone. However, the delivery of the ice particles to a submerged location in the thermal storage tank presents the fluid dynamics problem that is discussed above—a problem that may be exacerbated by the tendency of the ice particles to stick together or "agglomerate" during transport under certain temperature conditions, i.e., subfreezing surface temperatures. Thus, there is a need for a delivery system of the mentioned class, particularly suited to the delivery of ice particles.

While ice delivery is one important environment in which the above buoyant particle transport system is applicable, other environments lend themselves to this approach as well, for example, processes in the food industry, pulp and paper industry, and chemical processing industry in which it is desirable to inject buoyant particles at the bottom of a bath or reactor tank followed by recovery of the particles after they have floated to the surface.

SUMMARY OF THE INVENTION

The present invention provides a novel and versatile system for transporting buoyant particles to a submerged location. The system may be conveniently custom-tailored to meet a wide range of transport problems. In one aspect, the invention may be defined as a method of transporting buoyant particulate material to a submerged location in a vessel containing fluid whereby the buoyant particles and a transport fluid are introduced into the upper end of a delivery conduit which terminates substantially below the fluid level in the vessel. The transport fluid is provided with a sufficient downward axial velocity to create enough drag to overcome the buoyant force of the buoyant particles, thereby entraining the buoyant particles in the transport fluid. A swirl is imparted to the transport fluid and the entrained buoyant particles with sufficient angular velocity to facilitate efficient transport to the discharge end of the conduit.

In another aspect, the invention is more particularly defined as an apparatus for transporting ice particles to a submerged location in a flooded tank such as a thermal storage tank. The apparatus includes a substantially conical hopper which is positioned above the flooded tank and an ice delivery conduit that extends from the bottom of the hopper to an ice discharge point substantially below the free surface of the water in the tank. Means are provided for introducing ice particles into the hopper and for introducing a flow of swirl inducing water into the hopper at a desired mass flow rate and with a velocity component tangential to the hopper inner surface. The dimensions of the hopper and the mass flow rate and velocity of the swirl inducing water are sufficient (i) to cause the ice particles to become thoroughly mixed in the swirl inducing water while in the hopper, (ii) to provide the water/ice mixture as it enters the conduit with a sufficient axial velocity to create enough drag to overcome the buoyant force of the ice, thereby entraining the buoyant particles in the water, and (iii) to cause the angular velocity of the swirl inducing water to increase as it descends in the hopper to produce a swirl of entrained ice in water that is maintained substantially to the lower discharge end of the conduit.

BRIEF DESCRIPTION OF THE DRAWINGS

Some of the objects having been stated, other objects will appear as the description proceeds, when taken in connection with the accompanying drawings, in which.

DETAILED DESCRIPTION OF THE INVENTION

While the present invention will be described more fully hereinafter with reference to the accompanying drawings, in which aspects of the preferred manner of practicing the present invention are shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

Figure 1:
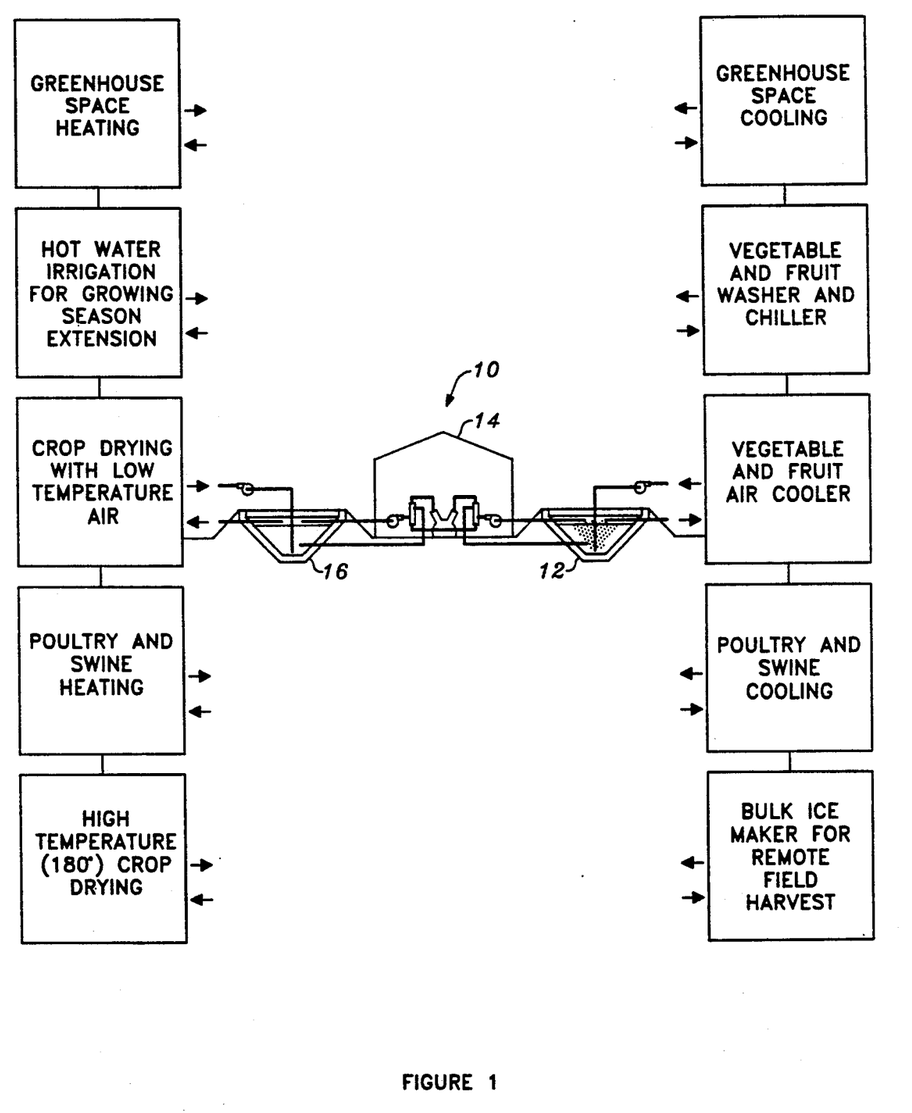
FIG. 1 is a schematic representation of a long term thermal energy storage system incorporating an ice/water thermal storage tank which may be charged with ice in accordance with the principles of the present invention.
Figure 2:
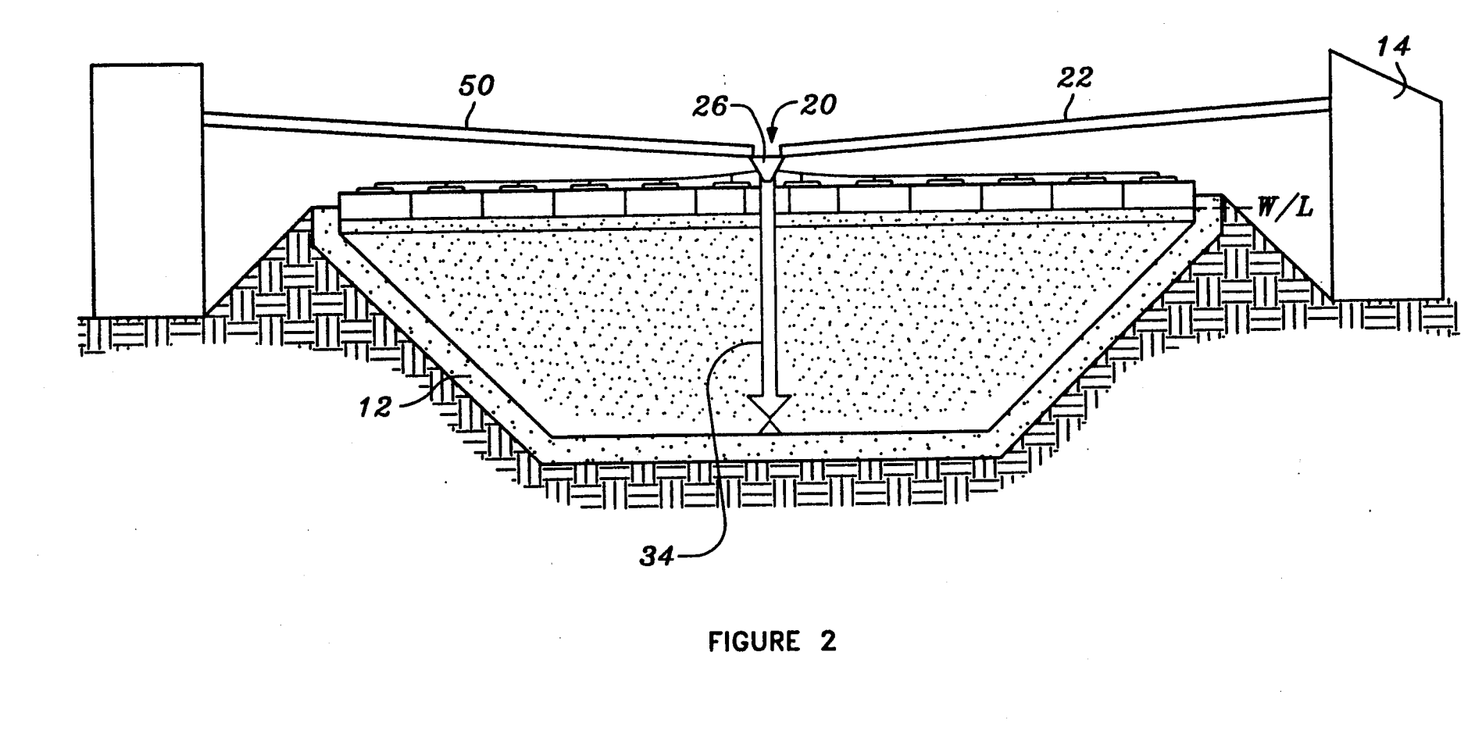
FIG. 2 is an enlarged, vertical cross-sectional view of the thermal storage tank illustrated in FIG. 1 showing some of the components of the buoyant particle transport system of the present invention.

While the invention has application to the transport of many types of buoyant particles, as discussed in more detail below, the invention will first be described in connection with a preferred embodiment as used in the transport of ice to a submerged location in a flooded thermal storage tank. Referring to the drawings, particularly to FIG. 1, there is shown in schematic form an annual thermal energy storage system 10 for agricultural usage which incorporates a cold storage tank 12 and ice transport system constructed in accordance with the principles of the present invention. A vapor compression ice machine 14 operates continuously year-round and delivers ice to tank 12 for use in one or more cooling operations in the summer months. Waste heat generated by ice machine 14 can be delivered to a hot storage tank 16 for use in heating applications in the winter months. The system permits the use of a prime mover (the ice machine) that is less than 10% the size of the prime mover that would be necessary to provide direct action cooling under a conventional direct acting system. System 10 is described in detail in commonly assigned, co-pending applications Ser. No. 07/543,169, entitled "Long Term Thermal Energy Production, Storage and Reclaim System," now U.S. Pat. No.

5,046,551 and Ser. No. 07/543,360 entitled "Thermal Storage Tank System and Method," now U.S. Pat. No. 5,063,748, the teachings of which are incorporated herein by reference.

Figure 6:
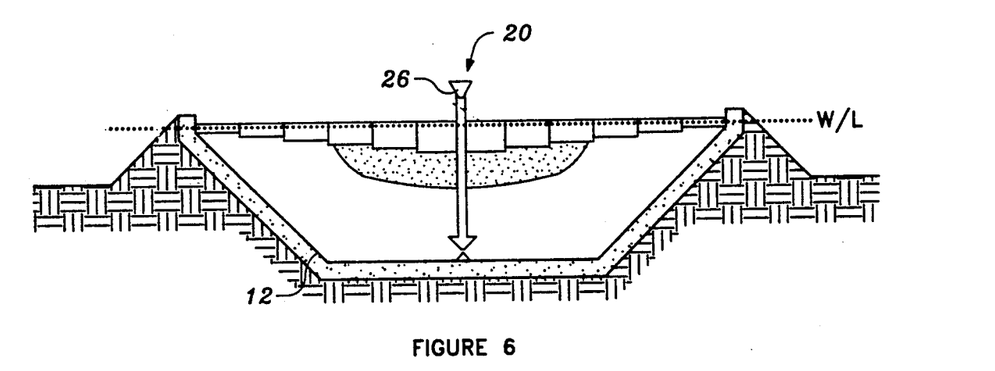
FIG. 6 shows the thermal storage tank at an 85% ice fraction.
Figure 7:
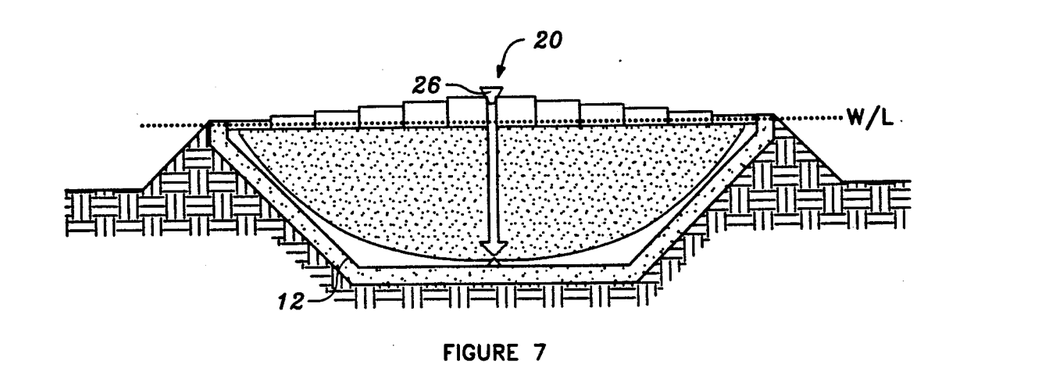
FIG. 7 shows the thermal storage tank at a 15% ice fraction.

With primary reference to FIGS. 2-5, the introduction of ice into thermal storage tank 12 and the building of an ice mass will now be described. Ice transport system 20 is designed to introduce pieces of ice at a submerged, single point discharge near the bottom of the tank 12. It has been discovered that when ice is discharged at a single submerged point in water, the ice produces an ice mass having an inverted angle of repose, analogous to the positive angle of repose created by the single point discharge of fluid particles onto a surface, for example, grain discharge from an elevated auger. The pieces of ice form an agglomerated ice mass that may grow from a relatively small size (for example, the 15% ice fraction illustrated in FIG. 7) to a relatively large size (for example, the 85% ice fraction illustrated in FIG. 6). As it is built, the ice mass retains a shape that roughly approximates that of an inverted frustum of a right circular cone. As illustrated, the storage tank may be constructed with a shape similar to that of the ice mass in order to reduce dead space in the tank.

Figure 3:
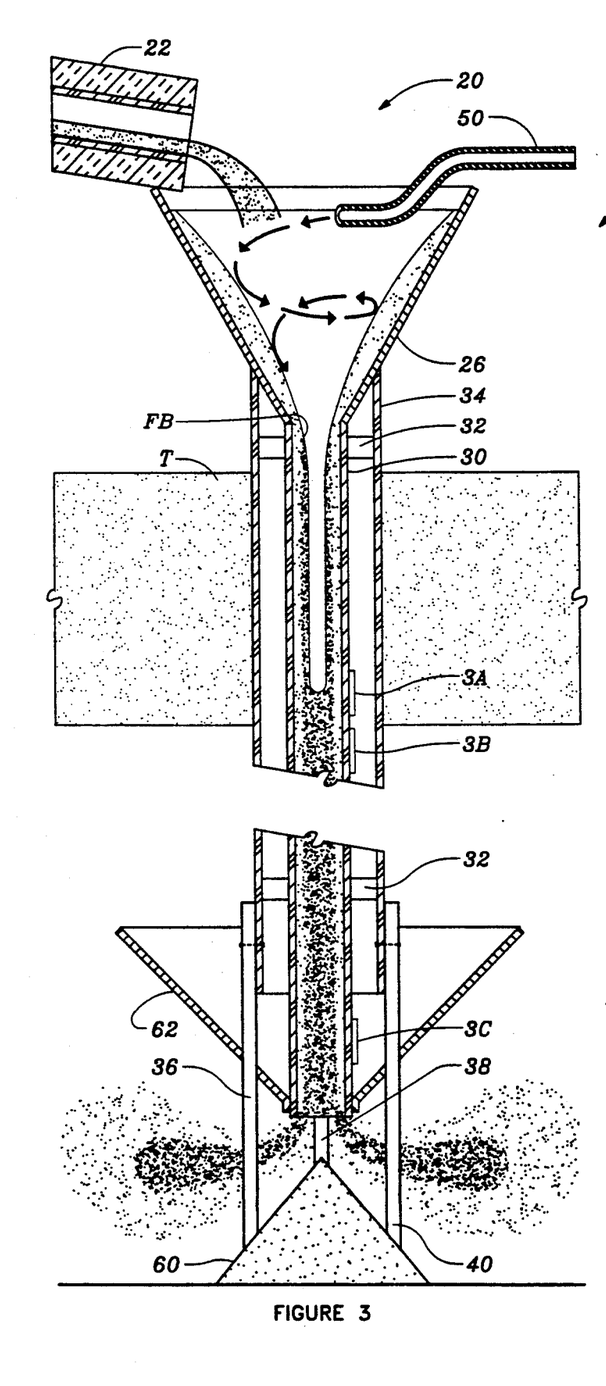
FIG. 3 is a further enlarged, fragmentary view, partly in section, of the thermal storage tank and illustrating the buoyant particle transport system which provides submerged ice discharge near the bottom of the tank.

Ice transport system 20 is connected to ice machine 14 by an ice conveyance pipe 22 which conveys pieces of ice to a substantially conical hopper 26, preferably with the assistance of a relatively low velocity wash water. Hopper 26 is secured in position at the top of the tank 12 and terminates above the water level W/L in the tank. The bottom of the hopper connects to the upper end of an ice delivery conduit 30 which extends downwardly to a point near the bottom of the tank. Discharge conduit 30, in turn, is supported by means of spiders 32 within an outer casing 34. As best shown in FIG. 3, casing 34 is secured at its upper end to the top T of the tank and at its lower end is secured to four support posts 36, 38, 40 and 42 (not shown).

Figure 5:
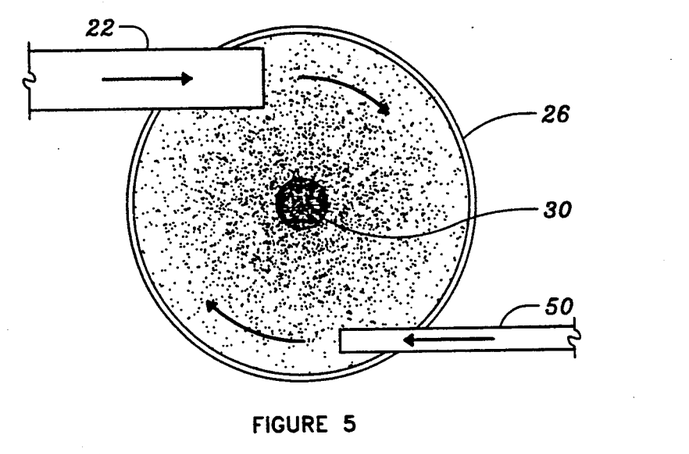
FIG. 5 is a top view of portions of the transport system illustrated in FIG. 3.

The swirl inducing water is delivered to hopper 26 by means of a pipe 50 that is oriented to discharge the swirl water substantially horizontally near the top of the hopper in a direction that is tangential to the hopper inner surface. Thus, the swirl water is delivered to the hopper in such a manner that it flows around the hopper with an initial angular velocity determined by its discharge velocity into the hopper. As the swirl water moves around the hopper, its angular momentum is conserved; thus, its angular velocity increases as it descends to the smaller diameter portions of the hopper. As the swirl water descends and accelerates in the hopper, the ice and wash water in the hopper become thoroughly mixed in the flow of swirl water. As this flow reaches the bottom of the hopper, it has a substantial angular velocity upon entry into the delivery conduit 30. The water in which the ice particles are carried, at the point of entering conduit 30, will be referred to as the "transport water"—in this case, the combination of the swirl inducing water and the wash water. In this regard, it is desirable for the discharge from pipes 22 and 50 to be additive from the standpoint of angular velocity. Thus, an arrangement for pipes 22 and 50 as shown in the top view of FIG. 5 is beneficial. The dimensions of the hopper and the mass flow rate and discharge velocity of the swirl water are chosen to (i) provide the transport water with a sufficient downward axial velocity to create enough drag to overcome the buoyant force of the ice particles, thereby entraining the ice particles in the transport water and (ii) cause the entrained ice particles/transport water flow through the delivery conduit to have a swirl that is maintained substantially to the end of the conduit. As explained in detail below, introduction of the transport water and entrained ice in this manner is believed to remove the ice particles from substantial contact with conduit walls, thus preventing the ice particles from migrating to areas of low velocity and attendant particle transport problems.

In a particular embodiment of the ice introduction system 20 which has produced remarkable success in a year-long ice storage system, the thermal storage tank has a depth on the order of 22 feet and a capacity of approximately 800,000 gallons. The tank remains flooded at all times, with the ice fraction varying by season. Hopper 26 has a height of approximately 3½ feet, a top diameter of approximately 3½ feet and a sidewall inclination of approximately 60° from horizontal. Ice delivery conduit 30 has an inside diameter of 8 inches and a length on the order of 20 feet, terminating approximately 2 feet above the floor of the storage tank where optional dispersion cone 60 and deflector 62 assist in dispersion of the ice as it exits the discharge end of the conduit. Ice is introduced by pipe 22 into hopper 26 at a rate of approximately 10 lbs. per second with a wash water flow of 50 gallons per minute (approximately 6.5 lbs. per second) at a discharge velocity on the order of 4 feet per second. Swirl inducing water is introduced by pipe 50 at 80 gallons per minute (approximately 10.5 lbs. per second) at a discharge velocity of approximately 8 feet per second. The combination of these two flow streams results in an angular velocity near the top of the hopper of approximately 6 radians per second, which increases to approximately 36 radians per second at the bottom of the hopper. The total mass flow rate of the transport water and entrained ice is approximately 27 lbs. per second delivered at 10 feet per second through the 8 inch ID conduit 30. Both the wash water and the swirl inducing water are provided by pumps (not shown) that are in communication with the water in the flooded storage tank. Thus, the wash water and swirl inducing water are simply taken from the tank, utilized in the ice delivery system and reintroduced into the storage tank.

Figure 3A:
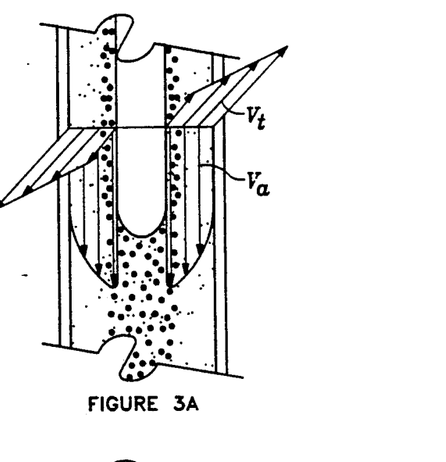
FIG. 3A is a further enlarged section view of a portion of the ice delivery conduit at the elevation indicated by the designation "3A" in FIG. 3, and showing the ice/transport water flow characteristics at that elevation and associated overlaid velocity vectors.

The above procedures are believed to produce a fluid flow pattern as illustrated in FIGS. 3, 3A, 3B and 3C. Referring to FIG. 3, it can be seen that the angular velocity of the water and ice in hopper 26 creates a free boundary situation FB that exists in the hopper and to a depth on the order of 4 feet down into conduit 30. The free boundary situation extends down to the point where the centrifugal force equals the gravitational force. FIGS. 3 and 3A show that in the free boundary region the ice particles—because they are less dense than the transport water—are forced toward the center of the flow path, removed from the conduit wall boundary. The velocity of the transport water is resolved into two velocity fields, with the vectors $V_a$ representing the downward axial velocity component and the vectors $V_t$ representing the tangential component. The axial velocity is greater toward the center because of the effects of friction on the flow at the conduit wall boundary and the tangential velocity is greater at the periphery than near the center.

Figure 3B:
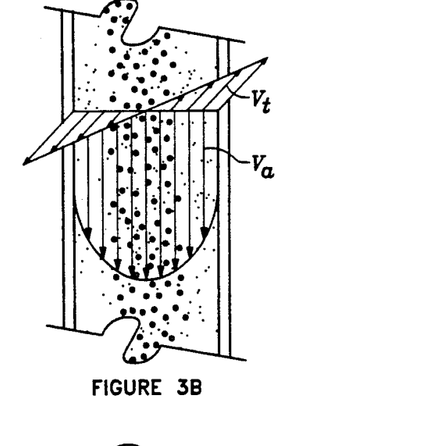
FIG. 3B is a view similar to that of FIG. 3A, but showing the condition at the elevation indicated by the designation "3B" in FIG. 3.

FIG. 3B represents the flow characteristics downstream of the free boundary situation. In this region, continued swirl still forces the less dense ice particles toward the center of the pipe, away from the conduit wall boundary.

Figure 3C:
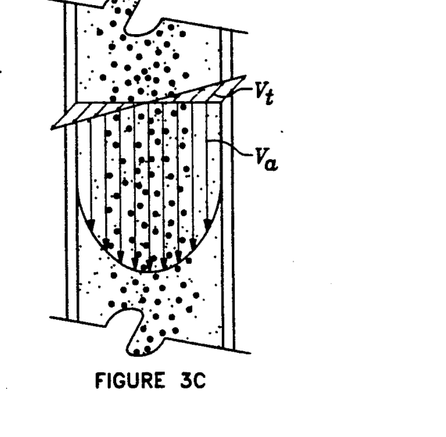
FIG. 3C is a view similar to that of FIGS. 3A and 3B, but showing the condition at the elevation indicated by the designation "3C" in FIG. 3.

FIG. 3C represents the flow much farther downstream, not far from the discharge end. In this region the swirl has diminished significantly so that the radial velocity component is less, but still sufficient to substantially remove the ice particles from the conduit wall boundary.

Maintaining the swirl effect to the end of conduit 30 has an added benefit in the delivery of ice to the bottom of the storage tank. Because of the swirl, the angular velocity of the ice particles at discharge tends to propel them slightly outwardly from the pipe and, more importantly, assists in the substantially uniform radial discharge of ice from the pipe, thus assisting in the building of a uniform, symmetric ice mass in the tank. In this regard, the optional dispersion cone 60 and deflector 62 are provided at the bottom of the tank to further assist in ice dispersion.

It will be appreciated that the above described ice delivery system is capable of delivering ice to levels substantially below the free surface of the water in the storage tank, e.g., 5 to 20 feet, or more. An advantage of the invention is that the delivery conduit diameter, mass flow rates and the dimensions of the hopper may be chosen so as to tailor any system operating under the principles of the invention to a given buoyant particle delivery task. Thus, the invention has application to buoyant particle transport systems for any depth where the transport is enhanced or otherwise facilitated by use of the principles of the invention. In this regard, as used herein, the term "substantially below the fluid level in the vessel" or similar terms are intended to refer to those depths in a vessel where the invention may be used to facilitate efficient transport to the discharge end of the delivery conduit.

It will also be appreciated that buoyant particle introduction into the transport system may be on a continuous or batch basis. The use of a hopper permits batch introduction of ice at instantaneous rates that exceed the flow limits of the delivery conduit, since the hopper may serve a metering function over short time periods.

In the specific example set forth above, the ratio by weight of transport water to ice during the transport operation is approximately 1.7:1, assuming continuous ice introduction at the stated rate. In many applications of the invention, a transport water to ice ratio in the range from about 3:1 to 1:2 may prove most effective, but this range is only illustrative, not limiting.

Figure 4:
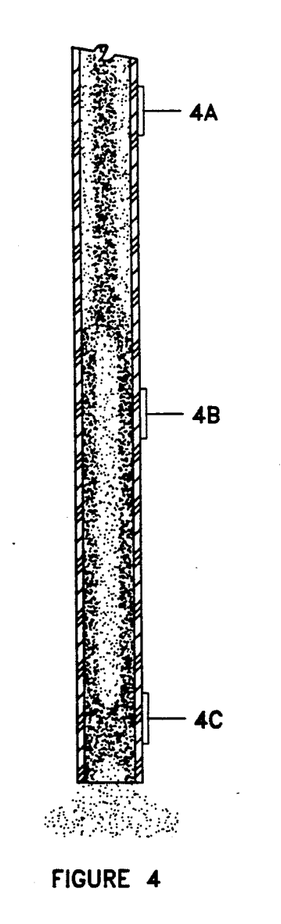
FIG. 4 is a cross sectional view of another ice delivery conduit showing the conditions of ice/transport water flow in a situation where the swirl effect ceases in the conduit.
Figure 4A:
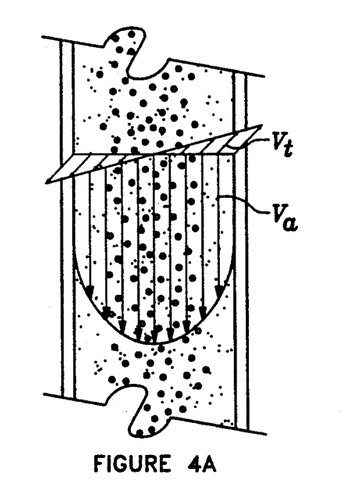
FIGS. 4A, 4B, and 4C are section views of portions of the ice delivery conduit of FIG. 4 at the elevations indicated by the designations "4A", "4B" and "4C", respectively.
Figure 4B:
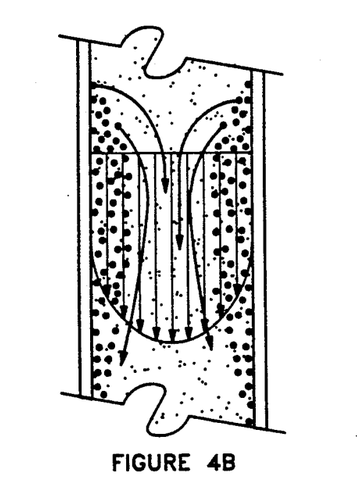
Figure 4C:
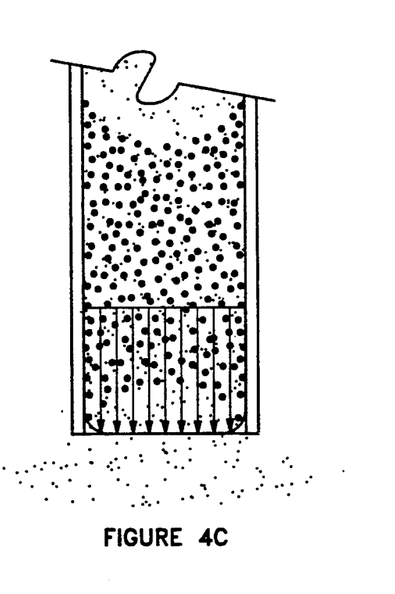

FIG. 4, 4A, 4B and 4C illustrate the problems that are believed to occur when an insufficient swirl is provided in the delivery of ice, problems that are particularly acute when the transport water is at or near 32° F. FIG. 4 shows the lower end of a delivery conduit in which the swirl is weak at level 4A and has just stopped at level 4B. The flow characteristics at level 4A still produce enough swirl to substantially remove the ice particles from the conduit wall boundary. However, at level 4B the ice particles have migrated to low velocity zones at the conduit walls, thus impeding flow. Level 4C depicts an undesirable condition that can develop as a result of the "N body flow problem" if the ice fraction in the transport fluid is too large. The ice particles can bridge the core flow channel and act as a filter media with water passing through it. This condition must be avoided if the transport fluid is at freezing conditions with little or no ice melting taking place. Thus, it is desirable to prevent blockage by maintaining a swirl effect at least to a point near the end of the delivery conduit, and preferably all the way to the end.

APPLICATIONS OF THE INVENTION FOR TRANSPORTING BUOYANT PARTICLES OTHER THAN ICE

The concepts of the present invention have application beyond the delivery of ice to submerged locations. For example, in the food industry the washing of buoyant food items such as sliced cucumbers, sliced carrots, or the like, may be achieved by below surface injection of the food items in a washing vessel, permitting the items to float the free surface of the wash fluid in the vessel (with or without agitation) and recovery of the food items at the free surface by skimming or other suitable means.

Also in the food industry, the invention has applicability to hot oil bath cooking operations wherein the buoyant food particles may be delivered to the bottom of an oil bath. The food particles cook while they float to the surface where they are skimmed off.

In the pulp and paper industry, buoyant wood chip particles may be injected at the bottom of a reactor tank containing a pulping agent and recovered at the surface after they have reacted with the pulping agent during the time they are floating to the surface. Similar procedures may be used for other chemical reactions of buoyant particles in a bath.

While the invention has been described in connection with certain illustrated embodiments, it will be appreciated that modifications may be made without departing from the true spirit and scope of the invention.

What which we claim is:

1. An apparatus for transporting buoyant particulate material to a submerged location in a vessel containing a fluid, said apparatus being characterized by providing a fluid dynamics system that permits the buoyant particles to move against the buoyant force created by their presence in the fluid, said apparatus comprising:
    a buoyant particle delivery conduit having an upper end and a lower end positioned for buoyant particle discharge substantially below the fluid level in the vessel;
    means for introducing buoyant particles into the conduit upper end; and
    means for introducing transport fluid to the conduit and (i) providing the transport fluid with a sufficient axial velocity to create enough drag to overcome the buoyant force of the buoyant particles, thereby entraining the buoyant particles in the transport fluid and (ii) imparting a swirl to the transport fluid and entrained particles of sufficient angular velocity to facilitate efficient transport to the discharge end of the conduit.

2. An apparatus as claimed in claim 1 wherein said means for introducing transport fluid and imparting a swirl produces a swirl of sufficient angular velocity to maintain the swirl to substantially the lower discharge end of the conduit.

3. An apparatus as claimed in claim 1 wherein said means for introducing transport fluid and imparting a swirl produces a swirl sufficient to maintain the angular velocity of the transport fluid and buoyant particles to the conduit lower discharge end, thereby encouraging uniform radially dispersed discharge of the buoyant particles into the vessel.

4. An apparatus as claimed in claim 1 wherein the transport fluid is the same fluid as that contained in the vessel.

5. An apparatus as claimed in claim 1 wherein the fluids are water and the buoyant particles are ice.

6. An apparatus as claimed in claim 5 wherein the transport fluid is water at or near 32° F.

7. An apparatus as claimed in claim 5 wherein the ratio by weight of transport water to ice during transport operations is in the range of about 3:1 to about 1:2.

8. An apparatus as claimed in claim 1 wherein the transport fluid is introduced into the conduit at an elevation above the free fluid level in the vessel, thereby providing a downward axial velocity component to the transport fluid.

9. An apparatus as claimed in claim 1 wherein said means for introducing buoyant particles and transport fluid to said conduit comprises a substantially conical hopper positioned above the fluid-containing vessel with the bottom of the hopper communicating with said delivery conduit, means for introducing buoyant particles into said hopper and means for introducing a swirl inducing water into said hopper.

10. A method of transporting buoyant particulate material to a submerged location in a vessel containing a fluid, said method being characterized by providing a fluid dynamics system that permits the buoyant particles to move against the buoyant force created by their presence in the fluid, said method comprising:
providing a downwardly extending buoyant particle delivery conduit having an upper end for receiving buoyant particles and a lower discharge end positioned for buoyant particle discharge substantially below the fluid level in the vessel;
introducing buoyant particles and a transport fluid into the upper end of the buoyant particle delivery conduit;
providing the transport fluid with a sufficient downward axial velocity to create enough drag to overcome the buoyant force of the buoyant particles, thereby entraining the buoyant particles in the transport fluid; and
imparting a swirl to the transport fluid and entrained buoyant particles of sufficient angular velocity to facilitate efficient transport to the discharge end of the conduit.

11. A method as claimed in claim 10 wherein the step of imparting a swirl produces a swirl of sufficient angular velocity to keep the buoyant particles removed from the conduit wall for substantially the entire length of the conduit.

12. A method as claimed in claim 10 wherein the step of imparting a swirl produces a swirl of sufficient angular velocity to maintain the swirl to the conduit lower discharge end, thereby encouraging uniform radially dispersed discharge of the buoyant particles into the vessel.

13. An apparatus for transporting ice particles to a submerged location in a flooded tank characterized by an ability to deliver the ice while overcoming the buoyant force on the ice particles, said apparatus comprising:
a substantially conical hopper positioned above the flooded tank;
an ice delivery conduit having an upper end communicating with the bottom of said hopper and a lower end positioned for ice discharge substantially below the free surface of the water in the tank;
means for introducing ice particles into the hopper; and
means for introducing a flow of swirl inducing water into said hopper at a desired mass flow rate and with a velocity component tangential to the hopper inner surface;
the dimensions of said hopper and the mass flow rate and velocity of the swirl inducing water being sufficient (i) to cause the ice particles to become thoroughly mixed in the swirl inducing water while in the hopper, (ii) to provide the water/ice mixture as it enters the conduit with a sufficient axial velocity to create enough drag to overcome the buoyant force of the ice, thereby entraining the buoyant particles in the water, and (iii) to cause the angular velocity of the swirl inducing water to increase as it descends in the hopper to produce a swirl of entrained-ice-in-water that is maintained substantially to the lower discharge end of the conduit.

14. A thermal storage tank system for storing an ice/water mixture whose thermal energy is available for satisfying a cooling load, said storage tank system comprising:
a storage tank;
means for maintaining a flooded state in said tank;
a substantially conical hopper positioned above the flooded tank;
an ice delivery conduit having an upper end communicating with the bottom of said hopper and a lower end positioned for ice discharge below the fluid level in the tank;
means for introducing ice particles into the hopper; and
means for introducing a flow of swirl inducing water into said hopper at a desired mass flow rate and with a velocity component tangential to the hopper inner surface;
the dimensions of said hopper and the mass flow rate and velocity of the swirl inducing water being sufficient (i) to cause the ice particles to become thoroughly mixed in the swirl inducing water while in the hopper, (ii) to provide the water/ice mixture as it enters the conduit with a sufficient axial velocity to create enough drag to overcome the buoyant force of the ice, thereby entraining the buoyant particles in the water, and (iii) to cause the angular velocity of the swirl inducing water to increase as it descends in the hopper to produce a swirl of entrained ice in water that is maintained to the lower discharge end of the conduit.

15. An apparatus as claimed in claim 14 wherein said means for introducing ice particles into said hopper comprises an ice conveyance pipe that discharges an ice and wash water mixture into the hopper.

16. An apparatus as claimed in claim 15 wherein said means for introducing a flow of swirl inducing water into the hopper comprises a pipe that is positioned to discharge the swirl inducing water substantially horizontally near the top of the hopper in a direction that is tangential to the hopper inner surface.

17. An apparatus as claimed in claim 16 wherein the discharge from the ice conveyance pipe and the discharge from the swirl water pipe are additive from the standpoint of angular velocity in the hopper.

18. An apparatus as claimed in claim 16 wherein the wash water and swirl inducing water are taken from the thermal storage tank, utilized in the ice delivery operation and reintroduced into the thermal storage tank.

* * * * *